(12) United States Patent
Restauri, III et al.

(10) Patent No.: US 9,457,661 B2
(45) Date of Patent: Oct. 4, 2016

(54) SYSTEMS AND METHODS FOR INFORMATION MANAGEMENT

(71) Applicant: Toyota Motor Engineering & Manufacturing North America, Inc., Erlanger, KY (US)

(72) Inventors: Donald A Restauri, III, Ypsilanti, MI (US); Katsumi Nagata, Ann Arbor, MI (US); Tuhin Diptiman, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 254 days.

(21) Appl. No.: 14/253,088

(22) Filed: Apr. 15, 2014

(65) Prior Publication Data

US 2015/0291033 A1    Oct. 15, 2015

(51) Int. Cl.
  *B60K 35/00*    (2006.01)
(52) U.S. Cl.
  CPC ....... *B60K 35/00* (2013.01); *B60K 2350/1084* (2013.01); *B60K 2350/1096* (2013.01)
(58) Field of Classification Search
  CPC .............. B60K 2350/1084; B60K 2350/1096
  USPC .................. 340/425.5, 426.1, 539.1, 539.11, 340/539.13
  See application file for complete search history.

(56) References Cited

U.S. PATENT DOCUMENTS

| | | | |
|---|---|---|---|
| 5,757,268 | A | 5/1998 | Toffolo et al. |
| 6,429,845 | B1 | 8/2002 | Unseld et al. |
| 6,892,116 | B2 | 5/2005 | Geisler et al. |
| 8,188,846 | B2 | 5/2012 | Cooper et al. |
| 2009/0096597 | A1 | 4/2009 | Avery, Jr. et al. |
| 2011/0004513 | A1* | 1/2011 | Hoffberg ............ G06Q 30/0207 705/14.1 |

FOREIGN PATENT DOCUMENTS

EP    903264 B1    9/1998

OTHER PUBLICATIONS

"In-vehicle displays: Driving information prioritization and visualization," 2 pages, dated Jan. 10, 2014.

\* cited by examiner

*Primary Examiner* — Daryl Pope
(74) *Attorney, Agent, or Firm* — Dinsmore & Shohl LLP

(57) ABSTRACT

Systems and methods for information management are provided. One embodiment of a method includes receiving a signal from a vehicle sensor, the signal related to a condition of a vehicle, determining a new alert from the signal, and comparing the new alert with a currently provided alert. Some embodiments include determining a priority of the new alert and, in response to determining that the new alert has a higher priority than the currently provided alert, determining whether to output the currently provided alert in a minimized form, providing the new alert for output on a primary output device, and providing the currently provided alert in the minimized form.

18 Claims, 4 Drawing Sheets

SYSTEMS AND METHODS FOR INFORMATION MANAGEMENT

TECHNICAL FIELD

Embodiments described herein generally relate to systems and methods for information management and, more specifically, to embodiments for automatically customizing output of textual or graphical information based on past usage and/or other preferences.

BACKGROUND

Many vehicles are now equipped with visual displays to inform a vehicle user, such as a driver, of a vehicle condition. As an example, many vehicles now provide a projected display that reflects an image off the interior portion of the windshield to provide the user with alerts related vehicle speed, fuel level, potential collisions, oil life, etc. While displays such as these provide important information to the user of the vehicle while maintaining the user's attention to the road, there are drawbacks to the current implementation of these systems. As an example, as vehicle electronics become more sophisticated, more information may be simultaneously output to the user. While the additional information may be beneficial to understanding proper operation of the vehicle, the added information may actually distract the user from important alerts.

SUMMARY

Systems and methods for information management are provided. One embodiment of a method includes receiving a signal with information related to a vehicle, determining a new alert from the signal, and comparing the new alert with a currently provided alert. Some embodiments include determining a priority of the new alert and, in response to determining that the new alert has a higher priority than the currently provided alert, determining whether to output the currently provided alert in a minimized form, providing the new alert for output on a primary output device, and providing the currently provided alert in the minimized form.

In another embodiment, a system for information management includes a vehicle sensor, a processor that is coupled to the vehicle sensor, a primary output device that is coupled to the processor, and a memory component that is coupled to the processor. The memory component may be configured to store logic that when executed by the processor, causes the system to receive, from the vehicle sensor, new information related to an alert, determine whether the new information is a higher priority than current information, and determine whether the new information includes a solution to the alert. In some embodiments, the logic causes the system to, in response to determining that the new information is a higher priority and includes the solution, provide the alert and the solution via the primary output device in a prominent location and alter a location of a lower priority information and, in response to determining that the new information is a lower priority than the current information and includes the solution, provide the alert in a less prominent location, with a user option to view the solution.

In yet another embodiment, a vehicle includes a vehicle sensor and a memory component. The memory component may include logic that causes the vehicle computing device to receive a signal from the vehicle sensor, the signal related to a condition of a vehicle, determine a new alert from the signal, and determine a priority of the new alert. In some embodiments, the logic causes the vehicle computing device to, in response to determining that the new alert has a higher priority than a currently provided alert, determine whether to output the currently provided alert on a secondary output device, provide the new alert for output on a primary output device, and provide the currently provided alert on the secondary output device. In some embodiments, the logic causes the vehicle computing device to, in response to determining that the new alert does not have a higher priority than the currently provided alert, determine whether to output the new alert on the secondary output device, provide the currently provided alert for output on the primary output device, and provide the new alert on the secondary output device.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing information management. Accordingly, some embodiments may be configured to provide an output of alerts to a vehicle user. The output device may include a visual output device such as a traditional in-dash display, a windshield display, and/or other display where a plurality of different information may be provided. Similarly, the output device may include an audio output device, such as speakers, buzzers, and the like. The output device may include a haptic output device to provide a haptic output, such a vibrating seat and/or steering wheel. Depending on the output display device that is providing the alert, the alert may include a visual output, an audio output, and/or a vibrational output and may be made for in-vehicle information such as vehicle conditions and/or out of vehicle information, such as traffic, weather, internet radio, news, etc.

Accordingly, embodiments disclosed herein relate to a system and/or method for prioritizing information that is provided by the vehicle. As an example, if a first piece of information is received by a vehicle computing device, the vehicle computing device may update an information management system, which may provide the first piece of information for output. If the vehicle computing device receives a second piece of information (or information that exceeds a threshold for fitting on the visual display), a determination is made regarding whether the new information has a higher priority than the currently output information. A determination may then be made regarding whether to remove the lower priority information (permanently or for a limited predetermined amount of time) or to minimize and/or reduce the size, volume, and/or intensity of the lower priority information. This determination may be based on historical usage, a user setting, a system setting, a user input, and/or may be based on other criteria. Based on the determined action, the information management system may alter the output of the alert.

Figure 1:
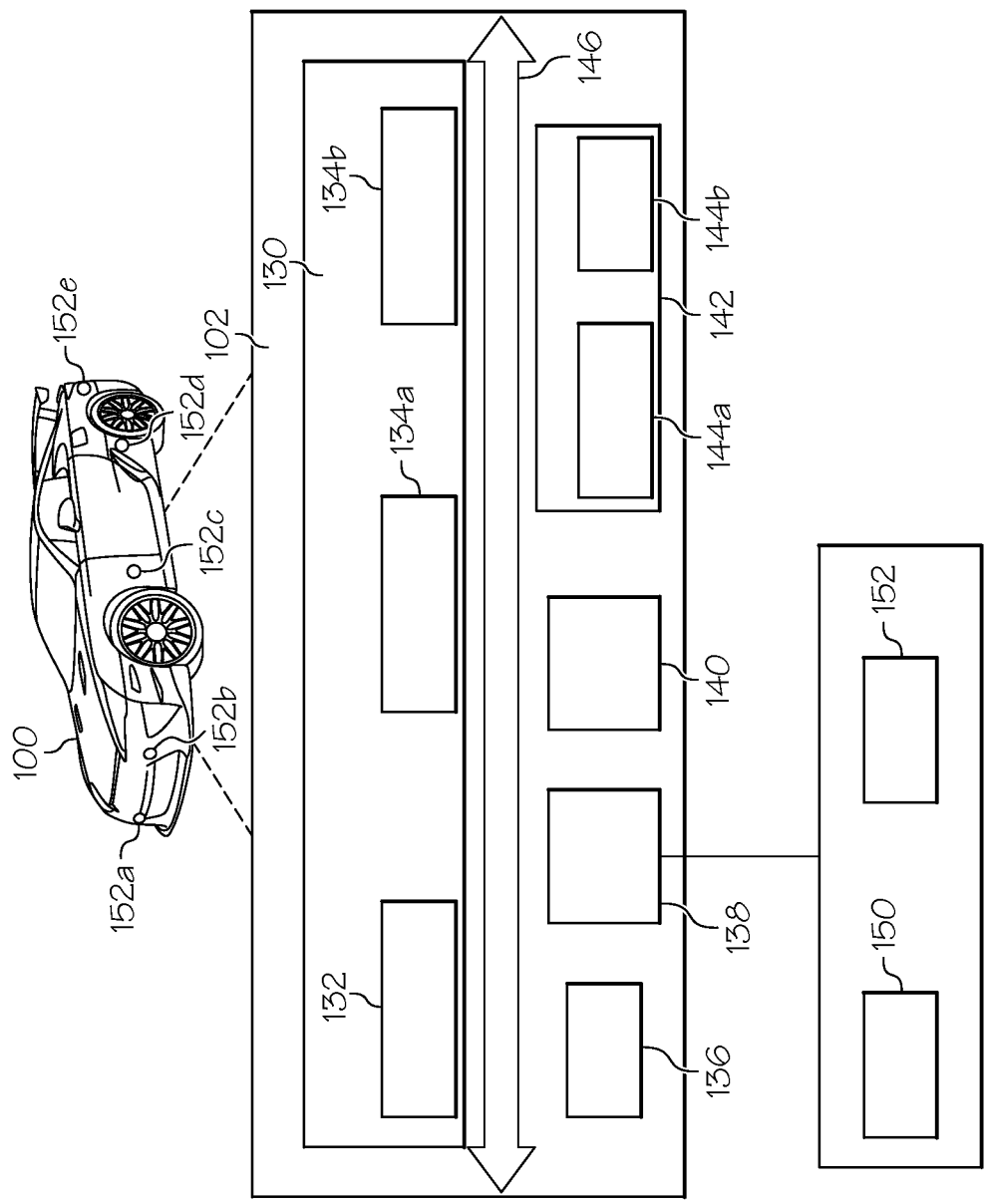
FIG. 1 schematically depicts a vehicle that may provide information management, according to embodiments disclosed herein.

Referring now to the drawings, FIG. 1 schematically depicts a vehicle 100 that may provide information management, according to embodiments disclosed herein. As illustrated, the vehicle 100 may include a plurality of vehicle sensors 152a, 152b, 152c, 152d, and 152e (collectively "vehicle sensors 152"). The vehicle sensors 152 may include proximity sensors (including laser, infrared, camera, etc.), tire pressure sensors, engine sensors, oil sensors, on-board cameras, fuel sensors, and/or other sensors, as described herein to send a signal identifying a condition of the vehicle 100. Also included is a vehicle computing device 102, which may be utilized as an information management system.

Also illustrated in the vehicle computing device 102 are a memory component 130, a processor 136, input/output hardware 138, network interface hardware 140, and a data storage component 142 (which stores priority data 144a, alert data 144b, and/or other data). The memory component 130 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 102 and/or external to the vehicle computing device 102.

The memory component 130 may store operating logic 132, alert determination logic 134a, and alert priority logic 134b. The alert determination logic 134a and the alert priority logic 134b may each include a plurality of different pieces of logic, each of which may be embodied as a computer program, firmware, and/or hardware, as an example. A communications path 146 is also included in FIG. 1 and may be implemented as a bus or other communication interface to facilitate communication among the components of the vehicle computing device 102.

The processor 136 may include any processing component operable to receive and execute instructions (such as from a data storage component 142 and/or the memory component 130). As described above, the input/output hardware 138 may include and/or be configured to interface with external components, such as output devices 150 and/or the vehicle sensors 152. As described in more detail below, the output devices 150 may include one or more audio output devices, such as speakers and/or one or more visual output devices, such as video monitors, in-dash touch screen control interfaces, windshield displays and/or other similar devices for providing alerts to a vehicle user. The vehicle sensors 152 may include one or more external, interior and/or engine sensors for determining a status of the vehicle 100.

The network interface hardware 140 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the vehicle computing device 102 and other computing devices.

The operating logic 132 may include an operating system and/or other software for managing components of the vehicle computing device 102. As discussed above, the alert determination logic 134a may reside in the memory component 130 and may be configured to cause the processor 136 to receive one or more signals from at least one vehicle sensor 152 and determine an alert that may be provided to a user. Similarly, the alert priority logic 134b may be utilized determine the priority and organization of the alerts determined via the alert determination logic 134a.

It should be understood that while the components in FIG. 1 are illustrated as residing within and/or connected to the vehicle computing device 102, this is merely an example. In some embodiments, one or more of the components may reside external to the vehicle computing device 102. It should also be understood that, while the vehicle computing device 102 is illustrated as a single device, this is also merely an example. In some embodiments, the components depicted therein may reside on different computing devices.

Additionally, while the vehicle computing device 102 is illustrated with the alert determination logic 134a and the alert priority logic 134b as separate logical components, this is also an example. In some embodiments, a single piece of logic may cause the vehicle computing device 102 to provide the described functionality.

Figure 2:
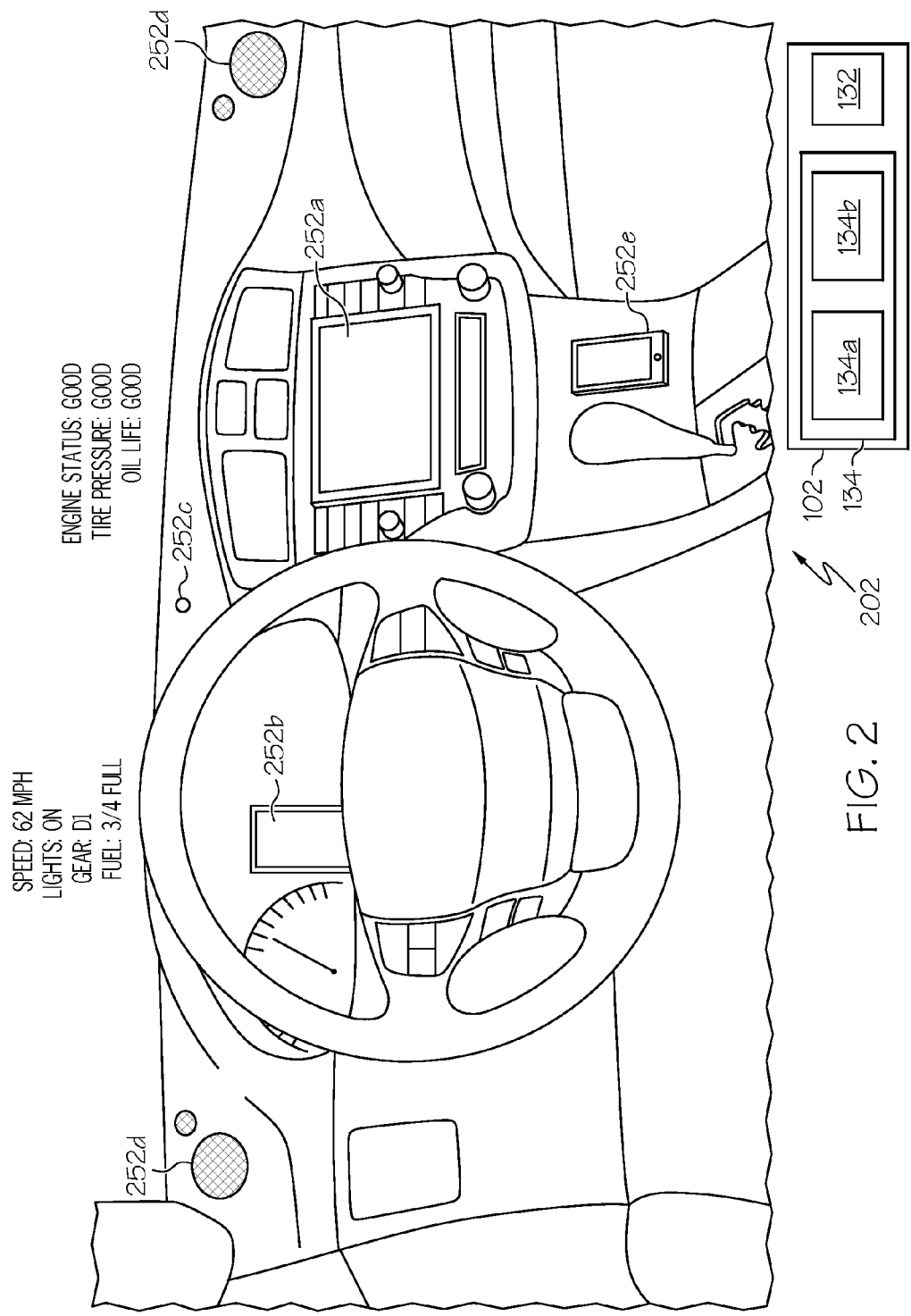
FIG. 2 schematically depicts an interior of a vehicle that may provide information management, according to embodiments disclosed herein.

FIG. 2 schematically depicts a vehicle interior 202 that may provide information management, according to embodiments disclosed herein. As illustrated, the vehicle 100 may include the vehicle computing device 102 and the memory component 134, with the operating logic 132, the alert determination logic 134a, and the alert priority logic 134b. The vehicle interior 202 includes a plurality of output devices 252a, 252b, 252c, 252d, and 252e (collectively referred to as "the output devices 252"). The output devices 252 include a console display device 252a, an in-dash display 252b, a windshield display 252c, an audio output device 252d, and a mobile device 252e. The console display device 252a may include a touch screen and/or other input output interface for outputting one or more alerts to a user. The alerts may include a speed alert, a lights alert, a gear alert, a fuel level alert, an engine status alert, a tier pressure alert, an oil life alert, a collision alert, and/or other alerts. Accordingly, at least a portion of these alerts and/or other alerts may be provided to the user via, for example, the windshield display 252c. While such an embodiment may provide many details of the vehicle 100, important information may be missed by the user, due to the sheer number of alerts being output.

It should be understood that in some embodiments, at least one output device 252, such as the windshield display 252c, may be designated as the primary output device. The primary output device may be the output device 252 that provides a more prominent alert to the user and/or may be designated based on a user or administrator preference. Additionally, at least one secondary output device 252 may be designated as those output devices that could provide lower priority alerts.

Figure 3:
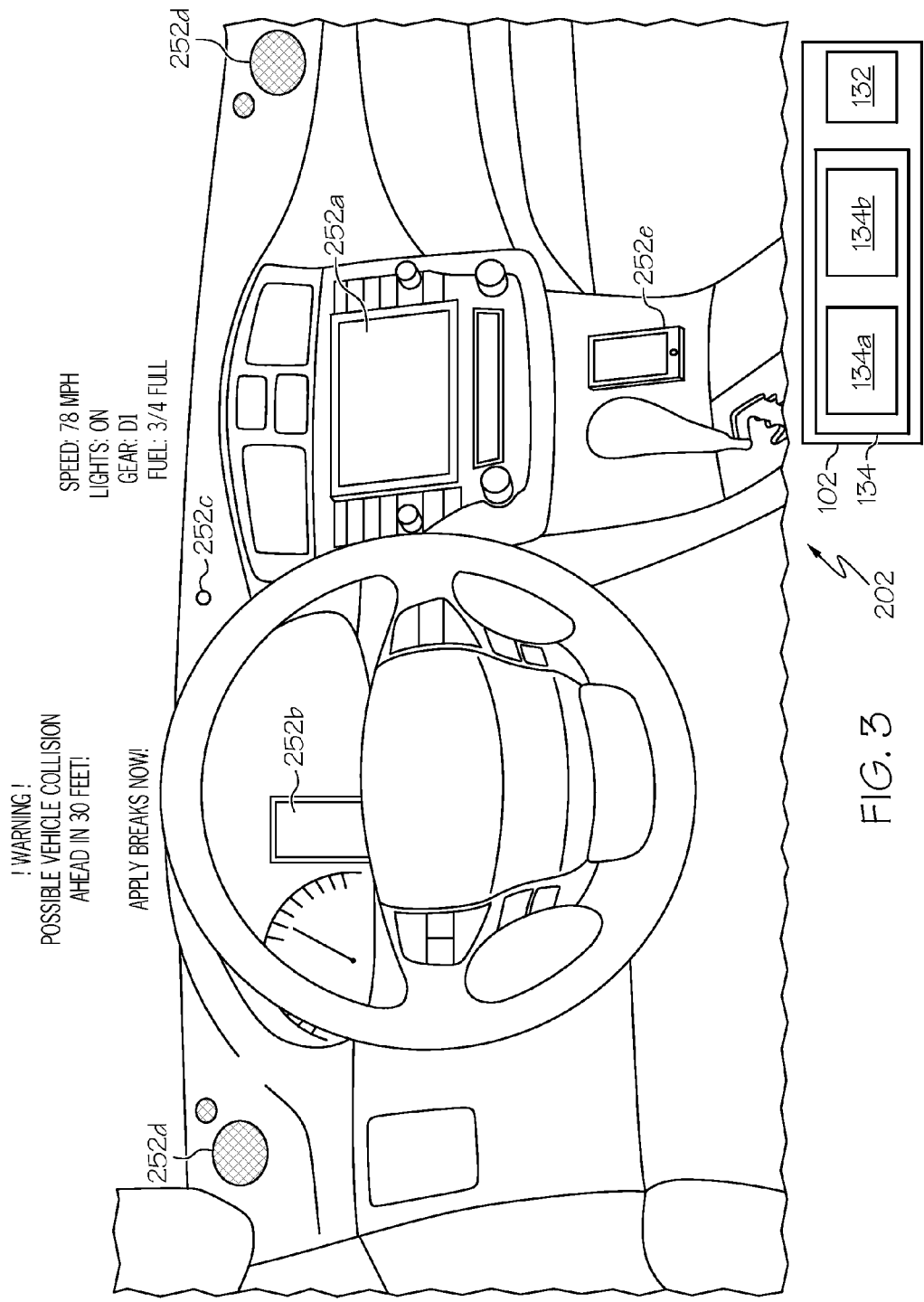
FIG. 3 schematically depicts the interior of the vehicle, illustrating rearrangement of an alert, according to embodiments disclosed herein.

FIG. 3 schematically depicts the vehicle interior 202, illustrating rearrangement of an alert, according to embodiments disclosed herein. As illustrated, the vehicle computing device 102 may determine a new issue for which an alert will be provided. The vehicle computing device 102 may receive information regarding the new alert and determine a priority of the new alert relative to a currently provided alert (or alerts). Based on the determined priority and the number of other alerts that are currently be provided, the alerts may be rearranged and/or minimized to ensure the user views the highest priority alert. In the specific example of FIG. 3, the vehicle sensors 152 (from FIG. 1) may detect that another vehicle is stopped and in the path of the vehicle 100. Accordingly, this may be determined to be a high priority alert. A determination may be additionally made regarding whether the total number of alerts exceeds a predetermined threshold. If not, the high priority alert may be placed in a predetermined position on the windshield display 252c and the location of the lower priority alerts may simply be rearranged on the windshield display 252c to a less prominent location. If the total number of alerts exceeds the predetermined threshold, a determination may be made regarding whether the lower priority alerts should be minimized, removed from the windshield display 252c and placed on another output device 252, and/or removed from all vehicle outputs (permanently or temporarily).

As another example, if the highest priority alert exceeds a predetermined high threshold, a plurality of different output devices 252 may be utilized to provide the alert. As an example, if the vehicle 100 is likely to impact another vehicle, this may meet a high priority threshold and the windshield display 252c may provide an alert in the middle of the display with all other alerts being minimized and/or removed from the windshield display 252. Additionally, the audio output device 252d may audibly provide the alert to the user, while the mobile device 252e may provide vibration alerts, such that if the mobile device 252e is in the user's pocket, he/she will feel the alert.

Specifically, some embodiments may be configured such that an alert may be provided via the mobile device 252e. Alerts provided by the mobile device 252e may be lower priority and/or may be part of a higher priority that are also being provided by other output devices 252. Similarly, some embodiments may be configured such that the mobile device 252e operates as a computing device (and thus includes a memory and/or processor) to determine an alert to provide to the user. In such embodiments, the mobile device 252e may include one or more sensors or be configured to communicate with sensors for determining an alert to provide to the user. As an example, the mobile device 252e may determine that a weather condition in the area is becoming dangerous. The mobile device 252e may communicate an alert of this condition to the user. In some embodiments, the mobile device 252e may communicate with the vehicle computing device 102 for including this alert with other alerts (and prioritizing accordingly). In still some embodiments, the mobile device 252e may determine priority of this alert and others and instruct the output devices to provide alerts accordingly.

It should also be understood that in some embodiments, the vehicle computing device 102 may determine one or more solutions to the alert. As an example, if an alert is that the vehicle 100 is in need of fuel, the vehicle computing device 102 may calculate the current range of the vehicle 100, determine fuel stations within that range, and provide driving directions to reach that fuel station. Thus, the alert may be provided and based on the relative priority of the alert and the solution, the arrangement of all alerts may change. Thus, if the vehicle 100 has a current range of 60 miles, but the vehicle sensors 152 detect an impending collision, the vehicle computing device 102 may provide an alert on the windshield to turn in order to avoid the collision.

The vehicle computing device 102 may also provide an audible alert via the audio output device 252d. Having been determined to be lower priority alerts, the fuel-related alerts may be removed, minimized, and/or placed on a different output device 252. The solution may be provided automatically and/or in response to selection of a user option, depending on the particular embodiment.

Figure 4:
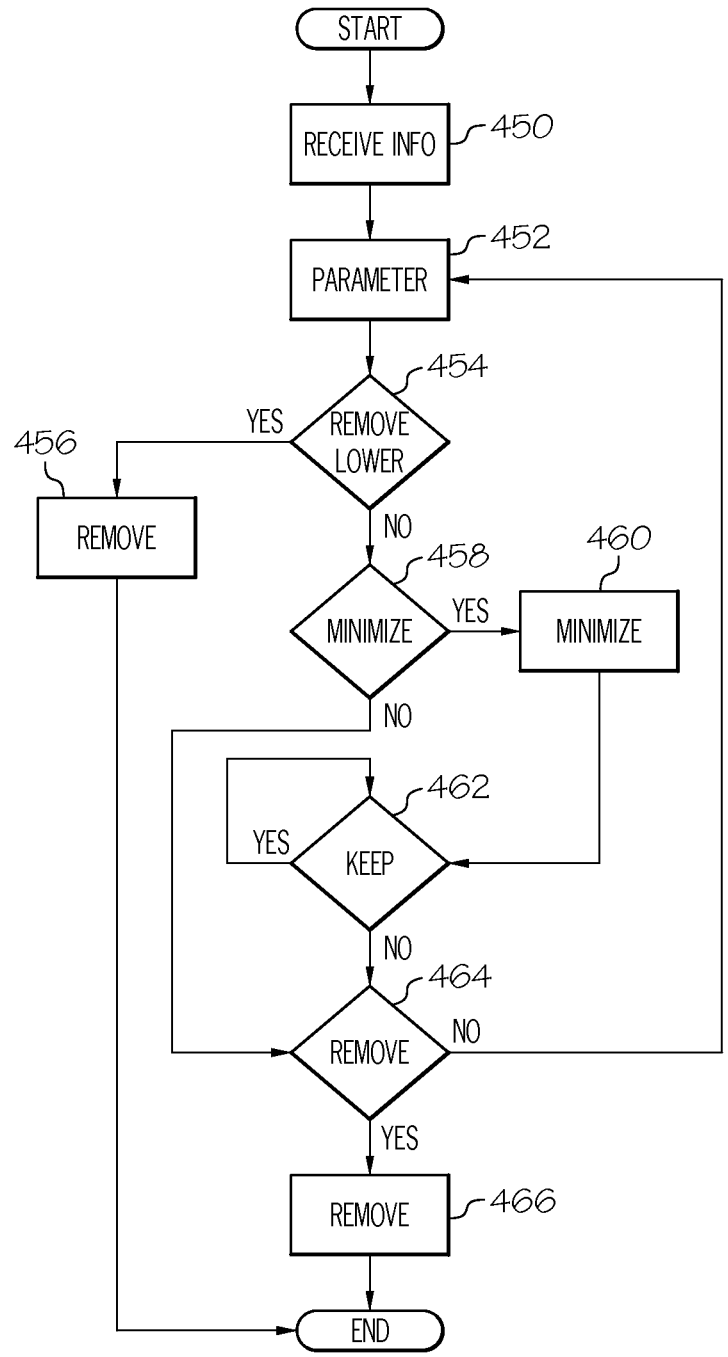
FIG. 4 depicts a flowchart for providing information management, according to embodiments disclosed herein.

FIG. 4 depicts a flowchart for providing information management, according to embodiments disclosed herein. As illustrated in block 450, new information may be received. This information may include data regarding a new alert, a resolution to an alert, and/or other similar data. In block 452, the vehicle computing device 102 may determine whether the new information or current information has a higher priority and which information has a lower priority. In block 454, a determination is made regarding whether to remove lower priority data from the display and/or being output. If so, the flowchart proceeds to block 456, where the lower priority information may be removed from the display and/or being output. If, in block 454, the lower priority data is not to be removed, the flowchart proceeds to block 458, where a determination may be made regarding whether to minimize the lower priority data. If so, in block 460, the lower priority data may be provided in a minimized format. The flowchart then proceeds to block 462, where a determination is made regarding whether to keep the information in minimized form. If so, the flowchart stays in block 462. If the information is not kept in minimized form, the flowchart proceeds to block 464, where a determination is made regarding whether to remove the information from being output. If so, the information is removed in block 466 and the flowchart ends. If the information is not to be removed, the flowchart returns to block 452. If, in block 458, the lower priority information is not to be minimized, the flowchart proceeds to block 464, where a removal determination is made, as discussed above.

As illustrated above, various embodiments of information management are disclosed. These embodiments may allow a user to focus only on the most important alerts to ensure proper operation of the vehicle 100. As such, lower priority data may be removed from being output, moved to another output device, and/or put into a minimized form.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for information management. It should also be understood that these embodiments are merely exemplary and are not intended to limit the scope of this disclosure.

What is claimed is:

1. A method for information management comprising:
receiving, by a computing device, a signal with information related to a vehicle;
determining, by the computing device, a new alert from the signal;
comparing, by the computing device, the new alert with a currently provided alert;
determining, by the computing device, a priority of the new alert;

in response to determining that the new alert has a higher priority than the currently provided alert, determining by the computing device whether to output the currently provided alert in a minimized form, providing the new alert for output on a primary output device, and providing the currently provided alert in the minimized form;

in response to determining that the new alert does not have a higher priority than the currently provided alert, determining by the computing device whether to output the new alert in the minimized form, providing the currently provided alert for output on the primary output device, and providing the new alert in the minimized form on the primary output device; and in response to determining that the new alert has a higher priority than the currently provided alert, determining a solution to the new alert, and providing the solution to the new alert for output.

2. The method of claim 1, further comprising:

in response to determining to not provide the currently provided alert in the minimized form, determining whether to remove the currently provided alert from being output; and in response to determining to not provide the new alert in the minimized form, determining whether to remove the new alert from being output.

3. The method of claim 1, further comprising:

in response to determining that the new alert is a higher priority than the currently provided alert, determining whether to provide the currently provided alert on a secondary output device; and in response to determining that the new alert is not a higher priority than the currently provided alert, determining whether to provide the new alert on the secondary output device.

4. The method of claim 1, further comprising determining whether the priority of the new alert meets a predetermined high threshold and, in response to determining that the priority of the new alert meets the predetermined high threshold, providing the new alert on a plurality of output devices.

5. The method of claim 1, wherein the new alert includes at least one of the following: a visual output, an audio output, and a haptic output.

6. The method of claim 1, wherein the minimized form includes at least one of the following: reducing a size of the new alert and removing the new alert from being output for a predetermined amount of time.

7. A system for information management comprising:
a vehicle sensor;
a processor that is coupled to the vehicle sensor;
a primary output device that is coupled to the processor; and
a memory component that is coupled to the processor, the memory component storing logic that when executed by the processor, causes the system to perform at least the following:
receive, from the vehicle sensor, new information related to an alert;
determine whether the new information is a higher priority than current information;
determine whether the new information includes a solution to the alert;
in response to determining that the new information is a higher priority and includes the solution, provide the alert and the solution via the primary output device in a prominent location and alter a location of a lower priority information; and
in response to determining that the new information is a lower priority than the current information and includes the solution, provide the alert in a less prominent location, with a user option to view the solution.

8. The system of claim 7, wherein the logic further causes the system to, in response to determining that the new information is the lower priority, determining whether to provide the new information in a minimized form.

9. The system of claim 8, wherein the logic further causes the system to, in response to determining to not provide the new information in the minimized form, determining whether to remove the new information from being output and wherein the minimized form includes at least one of the following: reducing a size of the new information and removing the new information from being output for a predetermined amount of time.

10. The system of claim 7, wherein the alert is related to at least one of the following: in-vehicle information and out of vehicle information.

11. The system of claim 7, wherein the logic further causes the system to, in response to determining that the new information has the lower priority, provide the new information on a secondary output device.

12. The system of claim 7, wherein the logic further causes the system to determine whether a priority of the new information meets a predetermined high threshold and, in response to determining that the priority of the new information meets the predetermined high threshold, providing the new information on a plurality of output devices.

13. The system of claim 7, further comprising a plurality of output devices, wherein each of the plurality of output devices includes at least one of the following: a visual output device, an audio output device, and a haptic output device.

14. A vehicle for information management comprising:
a vehicle sensor; and
a vehicle computing device that includes a memory component that includes logic that, when executed by a processor, causes the vehicle computing device to perform at least the following:
receive a signal from the vehicle sensor, the signal related to a condition of the vehicle;
determine a new alert from the signal;
determine a priority of the new alert;
in response to determining that the new alert has a higher priority than a currently provided alert, determine whether to output the currently provided alert on a secondary output device, provide the new alert for output on a primary output device, and provide the currently provided alert on the secondary output device;
in response to determining that the new alert does not have a higher priority than the currently provided alert, determine whether to output the new alert on the secondary output device, provide the currently provided alert for output on the primary output device, and provide the new alert on the secondary output device; and
in response to determining that determining that the new alert has a higher priority than the currently provided alert, determine a solution to the new alert, and provide the solution to the new alert for output.

15. The vehicle of claim 14, the logic further causing the vehicle computing device to, in response to determining that the new alert has the higher priority, determine whether to output the currently provided alert in a minimized form.

16. The vehicle of claim 15, wherein the minimized form includes at least one of the following: reducing a size of the new alert and removing the new alert from being output for a predetermined amount of time.

17. The vehicle of claim 14, the logic further causing the vehicle computing device to determine whether the priority of the new alert meets a predetermined high threshold and, in response to determining that the priority of the new alert meets the predetermined high threshold, provide the new alert on a plurality of output devices.

18. The vehicle of claim 14, further comprising a plurality of output devices, wherein each of the plurality of output devices includes at least one of the following: a visual output device, an audio output device, and a haptic output device.

* * * * *